United States Patent
Gonzalez et al.

(10) Patent No.: US 6,818,599 B2
(45) Date of Patent: Nov. 16, 2004

(54) METHOD FOR IN SITU FORMING OF UNSTABLE OIL IN WATER EMULSION, ESPECIALLY AS WELL SERVICING FLUID

(75) Inventors: Raul Possamai Gonzalez, Estado Zulia (VE); Jose Gregorio Navarro, Edo Zulia (VE)

(73) Assignee: Intevep, S. A., Caracas (VE)

( * ) Notice: Subject to any disclaimer, the term of this patent is extended or adjusted under 35 U.S.C. 154(b) by 258 days.

(21) Appl. No.: 10/104,735

(22) Filed: Mar. 21, 2002

(65) Prior Publication Data

US 2003/0187078 A1 Oct. 2, 2003

(51) Int. Cl.$^7$ ................................................ E21B 43/00
(52) U.S. Cl. ...................... 507/225; 507/262; 507/261; 507/276; 507/277; 507/937; 166/371; 166/305.1; 166/310
(58) Field of Search .............................. 166/371, 305.1, 166/310; 507/225, 261, 262, 276, 277, 937

(56) References Cited

U.S. PATENT DOCUMENTS

| | | | | |
|---|---|---|---|---|
| 3,467,195 A | * | 9/1969 | McAuliffe et al. | 166/371 |
| 4,795,478 A | * | 1/1989 | Layrisse R. et al. | 44/301 |
| 4,966,235 A | * | 10/1990 | Gregoli et al. | 166/267 |

* cited by examiner

Primary Examiner—Philip C. Tucker
(74) Attorney, Agent, or Firm—Bachman & LaPointe, P.C.

(57) ABSTRACT

A method for in situ forming of an unstable oil in water emulsion includes the steps of providing a mixture of an aqueous alkali salt solution and a surfactant, and pumping the mixture down a well containing a crude hydrocarbon having an API gravity of less than or equal to 26 so as to provide an unstable emulsion in the well, the unstable emulsion having the hydrocarbon as a dispersed phase and the solution as a continuous phase and having a ratio by weight of the hydrocarbon to the solution of at least about 50:50.

17 Claims, 3 Drawing Sheets

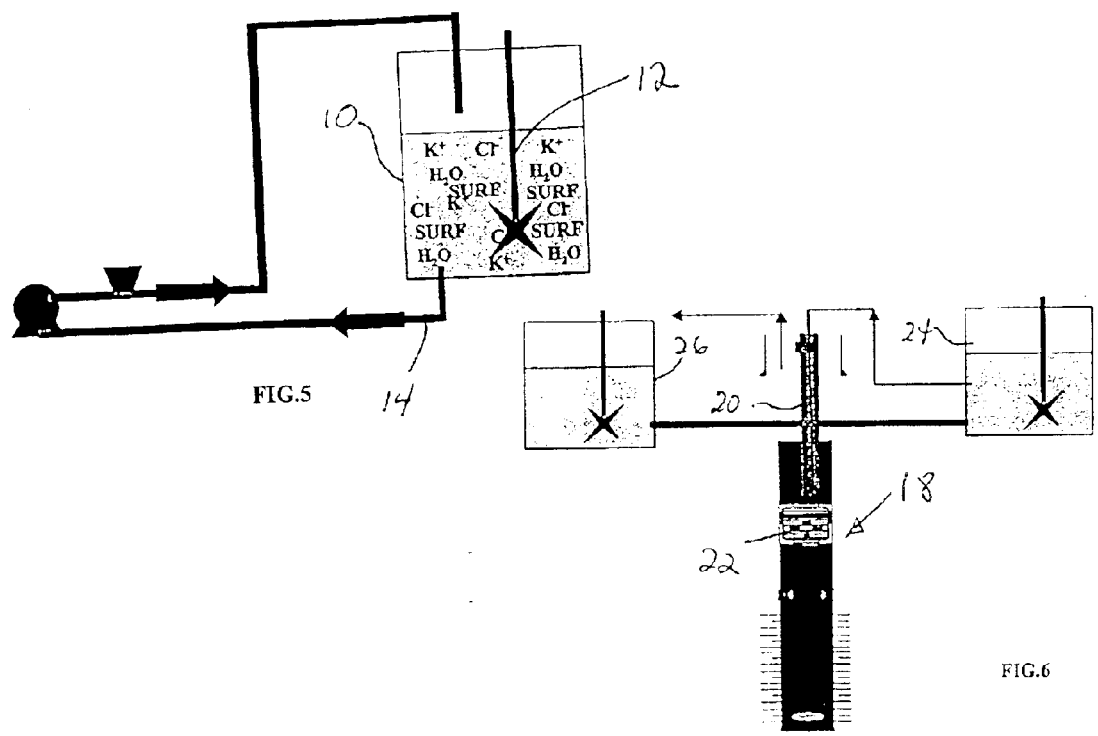
FIG.5
FIG.6
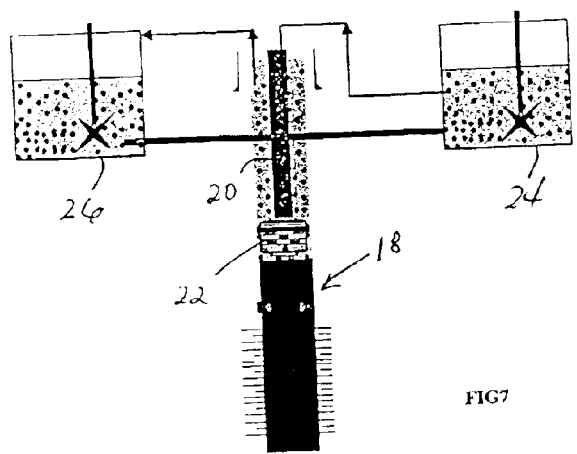
FIG7

METHOD FOR IN SITU FORMING OF UNSTABLE OIL IN WATER EMULSION, ESPECIALLY AS WELL SERVICING FLUID

BACKGROUND OF THE INVENTION

The invention relates to a method for in situ forming of an unstable oil in water emulsion which serves as an excellent well servicing fluid, and further which assists in production of viscous hydrocarbon from a subterranean well.

Many hydrocarbon reserves are in the form of viscous crude hydrocarbons, for example having API gravity of less than 26, and having viscosity at ambient temperatures of greater than 1200 cP. These hydrocarbons can be produced and refined into valuable end products, but pose difficulties in various aspects of the production stage.

Such crude hydrocarbons, by their nature, are difficult to pump or otherwise extract from the subterranean well, and are further difficult to transport through surface equipment and the like for the desired upgrading or refining.

Further, when a well is positioned into a viscous crude hydrocarbon bearing formation wherein the crude is as described above, the viscous crude hydrocarbon accumulates in the well, and can make well servicing difficult.

Methods for addressing this problem include, among others, the down hole formation of an emulsion of the hydrocarbon in water to reduce viscosity and make the resulting emulsion easier to pump to the surface. However, materials used in forming such down hole emulsions tend to adversely impact upon the formation, for example by causing swelling of the formation, which results in reduction in flowability of the hydrocarbon through the formation.

It is clear that the need remains for improved methods for servicing viscous crude hydrocarbon producing wells, and for producing such viscous crude hydrocarbon.

It is therefore the primary object of the present invention to provide a method for in situ or down hole forming of an oil in water emulsion which does not adversely impact the formation.

Other objects and advantages of the present invention will appear hereinbelow.

SUMMARY OF THE INVENTION

In accordance with the present invention, the foregoing objects and advantages have been readily attained.

According to the invention, a method is provided for in situ forming of an unstable oil in water emulsion, which method comprises the steps of providing a mixture of an aqueous alkali salt solution and a surfactant; and pumping said mixture down a well containing a crude hydrocarbon having an API gravity of less than about 26 so as to provide an unstable emulsion in said well, said unstable emulsion having said hydrocarbon as a dispersed phase and said solution as a continuous phase and having a ratio by weight of said hydrocarbon to said solution of at least about 50:50.

BRIEF DESCRIPTION OF THE DRAWINGS

A detailed description of preferred embodiments of the present invention follows, with reference to the attached drawings, wherein:

FIGS. 1–5 schematically illustrate preparation of an aqueous alkali salt solution and a surfactant in accordance with the present invention;

FIGS. 6–9 schematically illustrate a repair procedure using the method of the present invention.

DETAILED DESCRIPTION

Figure 1:
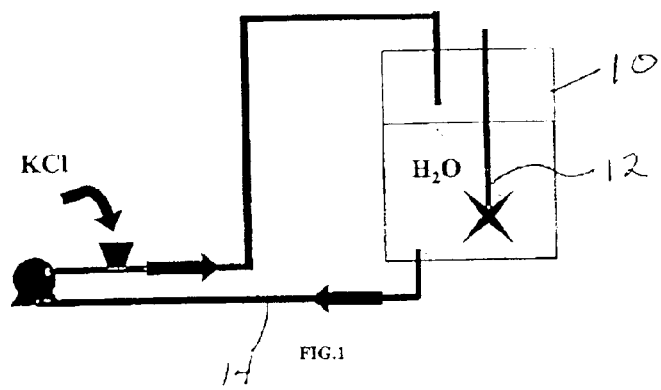
Figure 2:
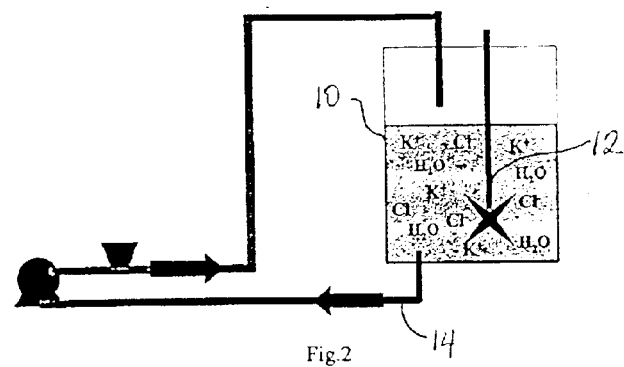

The invention relates to a method for in situ forming of an unstable oil in water emulsion which advantageously serves to facilitate well servicing or repair operations, and further to facilitate production of viscous crude hydrocarbon contained in the well.

In accordance with the present invention, a mixture of an aqueous alkali salt solution and a surfactant are pumped down hole so as to mix with a crude hydrocarbon within the well and form an unstable emulsion which advantageously has reduced viscosity as compared to the crude hydrocarbon, and which therefore facilitates well servicing, for example replacing pumps and other worn equipment and the like, and which further facilitates production of hydrocarbon to the surface.

In accordance with the present invention, and as will be demonstrated below, the mixture of aqueous alkali salt solution and surfactant in accordance with the present invention has advantageously been found to provide emulsions having the desired instability so that they can be broken and separated when desired, and further avoids formation damage such as swelling and the like which can adversely impact upon formation permeability.

In accordance with the present invention, it has been found that a mixture of surfactant with alkali salt aqueous solutions serves to provide the desired unstable emulsion, and further avoids damage to the formation due to swelling and the like.

This mixture is pumped into a well, preferably at a pressure sufficient to balance formation pressure, so as to mix with crude hydrocarbon down hole and form the desired unstable emulsion having reduced viscosity, so as to allow well servicing and so as to facilitate hydrocarbon production as desired.

The mixture to be pumped down hole, as set forth above, is a mixture of an aqueous alkali salt solution and a surfactant. Preferred aqueous alkali salt solutions include potassium salt solutions, most preferably potassium chloride salt solutions, and are advantageously provided having a salt concentration in an amount by weight, with respect to water, of between about 5,000 ppm and about 45,000 ppm. More preferably, the aqueous alkali salt solution is provided having a salt concentration of between about 20,000 and about 30,000 ppm.

The surfactant portion of the mixture is advantageously a mixture of non-ionic surfactants, preferably mixed with a copolymer of polyacrylamide. Preferred non-ionic surfactants include ethoxylated alkyl phenols, most preferably nonyl phenol ethoxylated with between about 10 and about 30 ethylene oxide groups.

The aqueous alkali salt solution-surfactant mixture is preferably mixed so as to provide a surfactant content in an amount greater than or equal to about 0.6% wt. based upon total weight of the mixture, and more preferably between about 0.6% and about 1.2% wt.

The solution is prepared relative to a quantity of water selected to provide the desired hydrocarbon—aqueous solution ratio, taking into account the amount of hydrocarbon in the well. This water may come from any suitable source, so long as the water does not contain substances which interfere with the desired emulsion forming mechanism or adversely affect formation characteristics.

Although numerous methods can be used for forming the mixture of salt solution and surfactant, FIGS. 1–5 schematically illustrate one method in accordance with the present invention.

Turning to FIG. 1, a tank 10 is shown with a mixer 12 schematically illustrated therein and a circulation line 14 adapted to draw from the bottom of tank 10 and feed to the top of tank 10. FIG. 1 shows an alkali salt, in this case KCl, being added to line 14 so as to produce an aqueous potassium chloride solution (See FIG. 2).

When forming the aqueous alkali salt solution, it is desired in accordance with the present invention to filter such solution so as to remove insoluble solids from the solution, which solids could adversely impact the formation when subsequently pumped down hole.

Figure 3:
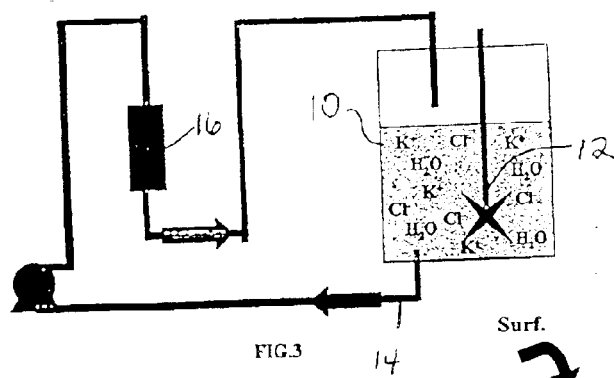

Thus, as shown in FIG. 3, the solution may advantageously be fed through a filter 16, which may advantageously be adapted so as to remove any solid having a size greater than a particular pre-selected size, for example about 2 microns.

Figure 4:
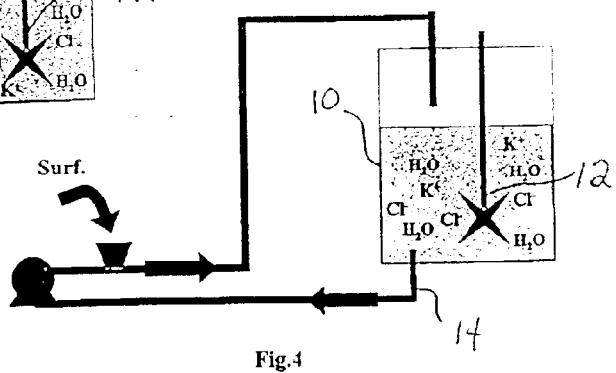

FIG. 4 schematically shows addition of a surfactant to the aqueous alkali salt solution, which is also substantially homogeneously mixed within tank 10 as shown schematically in FIG. 5 so as to produce the desired mixture of alkali salt solution and surfactant in accordance with the present invention. Of course, and as set forth above, although FIGS. 1–5 schematically illustrate preferred methods for forming the desired mixture, other methods would be readily apparent to one of ordinary skill in the art.

It should be noted that the water used to prepare the aqueous alkali salt solution may itself contain salts or chlorides, typically at a salt concentration of between about 50 ppm and about 4,000 ppm. These amounts should of course be taken into account when providing the desired total salt concentration of between about 5,000 ppm and about 45,000 ppm as set forth herein.

As set forth above, the aqueous alkali salt solution and surfactant mixture in accordance with the present invention, when pumped down hole, serves to produce an unstable emulsion, in situ, which is well suited for use as a servicing fluid, for example to allow repairs to be made to well equipment, and also facilitates pumping of the hydrocarbon contained in the emulsion to the surface.

FIG. 6 schematically shows a well 18 containing a viscous hydrocarbon and having a production tube 20 positioned therein. A pump 22 is schematically shown and is associated with tube 20 for pumping viscous crude from well 18 to the surface. FIGS. 6–10 schematically illustrate a method in accordance with the present invention wherein an unstable emulsion is formed down hole so as to allow replacement of pump 22.

Figure 8:
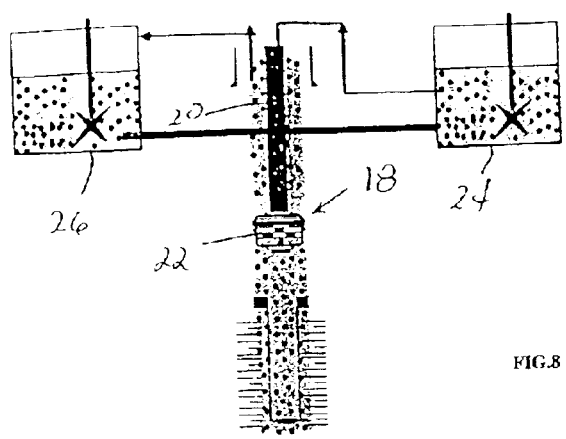
Figure 9:
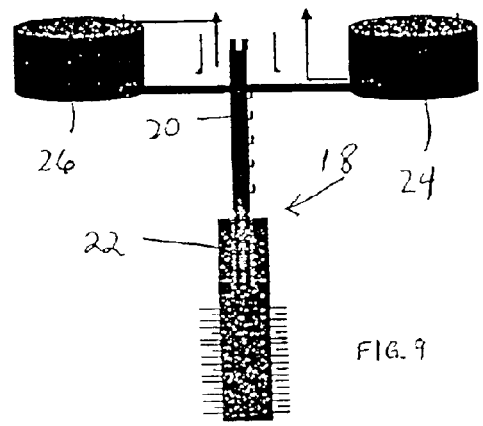

FIG. 6 shows a system wherein two tanks 24, 26 are positioned at the surface, each containing the aqueous alkali salt solution surfactant mixture in accordance with the present invention. Mixture from tank 24 is pumped down hole to mix with the hydrocarbon, and resulting fluid is pumped from well 18 into tank 26 and circulated back to tank 24. FIG. 7 shows the process at a beginning stage, wherein the mixture has circulated to the level of the pump. Pumping continues until the condition illustrated in FIG. 8 is reached, wherein an unstable emulsion has been formed throughout the well and is also being circulated through tanks 24, 26. The system at this stage is preferably stabilized by circulation of the unstable emulsion for several days, at which point different elements can be introduced into the well, for example to repair or replace pump 22 with a new pump (See FIG. 9). Upon completion of the repair procedure, production from well 18 can be resumed with the new equipment as desired, and the non stable emulsion can be subjected to static conditions wherein the emulsion rapidly breaks into two phases, namely, a produced hydrocarbon phase which advantageously has a viscosity that is reduced as compared to the original viscous hydrocarbon viscosity, and a separated aqueous alkali salt surfactant mixture which can be recycled to a further pumping step at the same or a different well for formation of the desired unstable emulsion in accordance with the present invention.

It has been found that emulsions formed according to the invention advantageously separate or break when allowed to rest, such that at least about 90% vol. of water from the emulsion separates when allowed to rest at a temperature of 180° F. for a period of 30 minutes.

In accordance with the present invention, the mixture is preferably injected through the well in amounts sufficient to form the resulting unstable emulsion having a ratio of hydrocarbon to aqueous alkali salt-surfactant mixture, by weight, of at least about 50:50, preferably 60:40 and more preferably 70:30.

It should be noted that the method of the present invention advantageously allows for formation of the desired emulsion down hole to allow for production and/or well servicing, without adversely effecting the formation, such that production and/or servicing can be carried out without negatively impacting upon production rates from the formation.

The following examples further illustrate the method of the present invention.

EXAMPLE 1

This example demonstrates the relationship between water content and viscosity of emulsions formed using water having only a small chloride content, and such water with surfactant.

A sample of Urdaneta crude was provided having the following characteristics: API gravity at 60° F., 10.3; dynamic viscosity at 77° F., 29,600 cP.

Lake Maracaibo water having a chloride concentration of less than about 2,000 ppm was used pure and with a surfactant content of less than about 1% by weight. Emulsions were formed at varying ratio by weight of hydrocarbon to water or surfactant solution. These emulsions were prepared by mixing at about 12,000 rpm for about 1–3 minutes, and viscosity was monitored. Tables 1 and 2 below present the data obtained for emulsions prepared with pure water and with surfactant solution, respectively, for systems formed having the shown amount by weight of water/surfactant solution.

TABLE 1

| Lake Maracaibo Water (% w/w) | Viscosity (cP) @ 77° F. |
| --- | --- |
| 3 | 29600 |
| 20 | 119900 |
| 36 | 150400 |
| 38 | 139200 |

TABLE 2

| Surfactant solution (% w/w) | Viscosity (cP) @ 77° F. |
| --- | --- |
| 3 | 29600 |
| 15 | 74573 |
| 30 | 600 |
| 45 | 93 |
| 60 | 40 |

Table 1 shows that the viscosity of emulsions increased when using Lake Maracaibo water without surfactant. It is believed that the emulsions formed were water in oil emulsions and they had a maximum water content of less than about 38% by weight.

Table 2 shows how initially the viscosity of emulsions formed using aqueous surfactant solution increased, but as water content increased beyond about 30%, viscosity decreased as the concentration of aqueous surfactant solution was increased. Thus, the surfactant solution did reduce viscosity at the higher water concentrations.

EXAMPLE 2

This example demonstrates the relationship between water content and viscosity of the emulsions formed using different amounts of chloride and no surfactant.

A Tia Juana crude was provided having the following characteristics: API gravity at 60° F., 14.3; dynamic viscosity at 77° F., 8376 cP, dynamic viscosity at 100° F., 4386 cP.

Potable water having a chloride concentration of less than 100 ppm was used pure and with about 30,000 ppm of added potassium chloride. Emulsions were formed at varying ratio by weight of hydrocarbon to water. These emulsions were prepared mixing at about 12,000 rpm for about 1–3 minutes, and both viscosity and stability as water separated within a 30 minute period at 180° F. were monitored. Tables 3 and 4 below present the data obtained for emulsions prepared with potable water pure and with a total of 30,000 ppm of potassium chloride, respectively.

TABLE 3

| Potable Water (w/w) | Viscosity (cP) @ 100° F. | Water separated (% w/w) 30 min 180° F.) |
| --- | --- | --- |
| 4.0 | 4386 | 0.0 |
| 13.6 | 5118 | 1.1 |
| 16 | 11760 | 2.2 |
| 19.5 | 16160 | 2.0 |
| 20.3 | 10380 | 2.5 |
| 21.9 | 10530 | 7.5 |

TABLE 4

| Potable Water with 30,000 ppm KCl (w/w) | Viscosity (cP) @ 100° F. | Water separated (% w/w) 30 min 180° F.) |
| --- | --- | --- |
| 4.0 | 4386 | 0.0 |
| 13.6 | 12760 | 1.5 |
| 19.5 | 16580 | 1.8 |
| 20.5 | 15360 | 0.5 |
| 23.2 | 23250 | 1.5 |
| 24.2 | 15330 | 0.0 |

Tables 3 and 4 show that viscosity increased as concentration of potable water with or without potassium chloride increased, and only small amounts of water separated. It is likely that these were water in oil emulsions. In addition to the high viscosity, these emulsions were also not sufficiently unstable.

EXAMPLE 3

This example demonstrates how the surfactant affects the relationship between water content and viscosity for emulsions formed using surfactant with and without potassium chloride.

Emulsions were formed using 0.6% by weight of surfactant and using the same crude and water solutions as in Example 2. These emulsions were prepared mixing at about 12,000 rpm for about 1–3 minutes, and both viscosity and stability as water separated within 30 minutes at 180° F. were monitored. Tables 5 and 6 below present the data so obtained.

TABLE 5

| | Without KCl and 0.6% surfactant | |
| --- | --- | --- |
| Potable Water (w/w) | Viscosity (cP) @ 100° F. | Water separated (% w/w) 30 min 180° F.) |
| 4 | 4386 | 0.0 |
| 10 | 10900 | 0.0 |
| 20 | 181 | 0.9 |
| 30 | 123 | 1.0 |
| 40 | 93 | 97.5 |
| 50 | 16 | 100.0 |
| 60 | 16 | 100.0 |

TABLE 6

| | With 30,000 ppm KCl and 0.6% surfactant | |
| --- | --- | --- |
| Potable Water (w/w) | Viscosity (cP) @ 100° F. | Water separated (% w/w) 30 min 180° F.) |
| 4 | 4386 | 0.0 |
| 10 | 10420 | 1.7 |
| 20 | 149 | 90.9 |
| 30 | 79 | 100.0 |
| 40 | 33 | 100.0 |
| 50 | 15 | 100.0 |
| 60 | 13 | 100.0 |

Tables 5 and 6 show how initially the viscosity of emulsions formed using aqueous surfactant solution increased, but with water content of more than about 20%, viscosity decreased. They also show that the amount of water separated at 180° F. within a 30 minute period increased as the concentration of aqueous surfactant solution was increased and both processes were improved by the potassium chloride so as to provide very unstable oil in water emulsions. Table 6, drawn to a preferred combination of amount of KCl with surfactant, showed particularly good reduction in viscosity and rapid separation.

EXAMPLE 4

This example demonstrates the relationship between surfactant content and viscosity of the emulsion, having a ratio of crude to surfactant solution of 60:40, formed with and without the preferred amount of potassium chloride.

Emulsions were formed using varying concentrations of surfactant (0.3, 0.6 and 0.9% wt.) and using the same crude and water and potassium chloride solution as in the Example 2 at a ratio by weight of crude to water solution of 60:40. These emulsions were prepared mixing at about 12,000 rpm for about 1–3 minutes, and both viscosity and stability as water separated within a 30 minute period at 180° F. were monitored. Tables 6 and 7 below present the data so obtained.

TABLE 6

Potable water without KCl as water phase at a ratio 60:40

| Surfactant Concentration (% by weight) | Viscosity (cP) @ 100° F. | Water separated (% w/w) 30 min 180° F.) |
|---|---|---|
| 0.3 | 397 | 55 |
| 0.6 | 94 | 97.5 |
| 0.9 | 77 | 98 |

TABLE 7

Potable water with 3% KCl as water phase at a ratio 60:40

| Surfactant Concentration (% by weight) | Viscosity (cP) @ 100° F. | Water separated (% w/w) 30 min 180° F.) |
|---|---|---|
| 0.3 | 76 | 100 |
| 0.6 | 43 | 100 |
| 0.9 | 30 | 100 |

As shown, the emulsion had a substantially lower viscosity than the pure crude in both cases. Viscosity decreased as surfactant concentration increased and the emulsions were very unstable and broke within a 30 minute period at 180° F. Both qualities were improved by the potassium chloride, and the resulting oil in water emulsions were very unstable. Table 7, drawn to the preferred amount of potassium chloride, shows particularly good results.

EXAMPLE 5

This example demonstrates the relationship between API gravity of the starting hydrocarbon or crude, and viscosity of the emulsion, for emulsions having ratio of crude to surfactant solution of 60:40, formed with and without desired levels of potassium chloride.

Samples of crudes from different formations, in Maracaibo Lake, Southwest Venezuela, were provided having different API gravity of about 26 and below, and dynamic viscosity of greater than about 1200 cP at ambient temperature.

Aqueous surfactant solution was prepared with potable water, having a chloride concentration of less than about 100 ppm and having 0.9% by weight of surfactant pure and with and without about 20,000 ppm of potassium chloride, at ratio of crude to aqueous surfactant solution of 60:40. These emulsions were prepared mixing at about 12,000 rpm for about 1–3 minutes, and both emulsion viscosity and stability as water separated within a 30 minute period at 180° F. were monitored. Tables 8 and 9 below present the data so obtained.

TABLE 8

Potable water with 0.9% by weight surfactant as water phase at a ratio 60:40

| | Viscosity (cP) @ 100° F. | | Water separated | Time |
|---|---|---|---|---|
| API | Crude | Emulsion | (% w/w) 30 min 180° F.) | (min) |
| 11.2 | 13140 | 63 | 96.2 | 30 |
| 14.6 | 3496 | 56 | 100 | 28 |
| 15.6 | 4542 | 60 | 93.8 | 28 |
| 26.1 | 1204 | 28 | 100 | 26 |

TABLE 9

Potable water with 20,000 ppm KCl and 0.9% by weight surfactant as water phase at a ratio 60:40

| | Viscosity (cP) @ 100° F. | | Water separated | Time |
|---|---|---|---|---|
| API | Crude | Emulsion | (% w/w) 30 min 180° F.) | (min) |
| 11.2 | 13140 | 33 | 96.2 | 28 |
| 14.6 | 3496 | 37 | 100 | 18 |
| 15.6 | 4542 | 45 | 93.8 | 24 |
| 26.1 | 1204 | 26 | 100 | 16 |

As shown, both types of emulsion had a lower viscosity than the pure crudes as desired, and they were very unstable and substantially broke within a 30 minute period at 180° F. The separation time decreased as API gravity of the crude sample increased. Viscosity and separation time decreased when the potable water had potassium chloride in desired amounts according to the invention.

EXAMPLE 6

This example demonstrates that no formation damage is caused by the unstable emulsion formed according to the present invention.

A sample of Urdaneta crude was provided having the following characteristics: API gravity at 60° F., 10.3; dynamic viscosity at 77° F., 29,600 cP.

Figure 10:
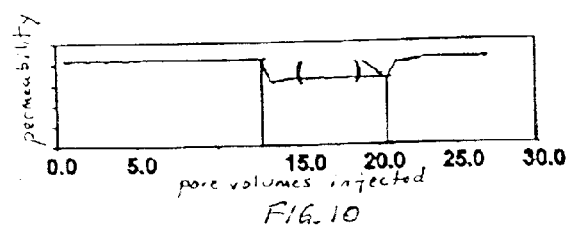
FIG. 10 demonstrates no formation damage when using the method of the present invention to form an unstable emulsion which is exposed to the formation.

An aqueous potassium chloride-surfactant solution was prepared with potable water, having a starting chloride concentration of 100 ppm, with about 30,000 ppm of added potassium chloride and having 0.9% by weight of surfactant. An unstable emulsion was formed at a ratio of crude to this aqueous surfactant solution of 60:40 by mixing at about 12,000 rpm for about 1–3 minutes. A coreflood experiment was performed on a reservoir core (UD-577), at reservoir conditions (180° F. and overburden pressure=3,500 psi). After the core was cleaned with organic solvent it was saturated with a 2% by weight sodium chloride solution under vacuum. Dead oil was injected, in the production direction, until the core permeability became constant, then the unstable emulsion was circulated in front of the opposite face of the reservoir core, increasing the pressure by 50 psi increments until a pressure of 1200 psi was reached. The reservoir core was maintained in contact with the unstable emulsion for 12 hours and again dead oil was injected, in production direction, until the core permeability became constant. FIG. 10 is a graph showing the permeability evolution of the core as a function of the pore volumes injected of dead oil. As shown, the permeability of the core after and before rate injection of the unstable emulsions are the same, demonstrating that the unstable emulsion did not cause any formation damage.

According to the present invention, methods have been provided which allow for in situ forming of a desirably unstable emulsion with significantly reduced viscosity as compared to the starting crude. This is accomplished with a minimal amount of additives, which are relatively economically obtained, and which can be re-used for successive operations on the same or additional wells.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for in situ forming of an oil in water emulsion, comprising the steps of:
   providing a mixture of an aqueous alkali salt solution and a surfactant, wherein said surfactant is a mixture of non-ionic surfactant with a copolymer of polyacrylamide; and
   pumping said mixture down a well containing a crude hydrocarbon having an API gravity of less than or equal to 26 so as to provide an emulsion in said well, said emulsion having said hydrocarbon as a dispersed phase and said solution as a continuous phase and having a ratio by weight of said hydrocarbon to said solution of at least 50:50.

2. A method for in situ forming of an oil in water emulsion, comprising the steps of:
   providing a mixture of an aqueous alkali salt solution and a surfactant;
   pumping said mixture down a well containing a crude hydrocarbon having an API gravity of less than or equal to 26 so as to provide an emulsion in said well, said emulsion having said hydrocarbon as a dispersed phase and said solution as a continuous phase and having a ratio by weight of said hydrocarbon to said solution of at least 50:50; and
   filtering said aqueous alkali salt solution said pumping step whereby formation damaging solids are removed.

3. The method of claim 1 or 2, wherein said alkali salt is a potassium salt.

4. The method of claim 1, or 2, wherein said alkali salt is potassium chloride.

5. The method of claim 1, further comprising the step of filtering said aqueous alkali salt solution before said pumping step whereby formation damaging solids are removed.

6. The method of claim 1 or 2, wherein said aqueous alkali salt solution contains alkali salt in an amount by weight, with respect to water, of between about 5,000 ppm and about 45,000 ppm.

7. The method of claim 1 or 2, wherein said mixture contains said surfactant in an amount greater than or equal to about 0.6% wt. based upon said mixture.

8. The method of claim 1 or 2, wherein said mixture contains said surfactant in an amount between about 0.6% and about 1.2% wt. based upon said mixture.

9. The method of claim 2, wherein said surfactant is a mixture of non-ionic surfactant with a copolymer of polyacrylamide.

10. The method of claim 1 or 9, wherein said non-ionic surfactant is selected from the group consisting of ethoxylated alkyl phenols.

11. The method of claim 10, wherein said ethoxylated alkyl phenols are selected from the group consisting of nonyl phenol ethoxylated with between about 10 and about 30 ethylene oxide groups.

12. The method of claim 1 or 2, wherein said emulsion is less viscous than said hydrocarbon.

13. The method of claim 1 or 2, wherein said pumping step is carried out at a pressure sufficient to balance formation pressure in said well.

14. The method of claim 1 or 2, further comprising the step of, while said emulsion is in said well, carrying out a well servicing operation.

15. The method of claim 1 or 2, further comprising the step of circulating said emulsion out of said well and breaking said emulsion so as to provide a produced hydrocarbon phase and a separated aqueous alkali salt surfactant mixture, and recycling said mixture back to said pumping step.

16. The method of claim 15, wherein said produced hydrocarbon phase is less viscous than said crude hydrocarbon.

17. The method of claim 1 or 2, wherein at least about 90% vol. of water from said emulsion is an unstable emulsion, that is, an emulsion which separates when said emulsion is allowed to rest at a temperature of 180° F. for a period of 30 minutes.

* * * * *